Jan. 19, 1943.   P. F. LAPIDOVSKY   2,308,619
APPLYING AND REMOVING ANTISKID CHAINS
Filed Sept. 25, 1941   3 Sheets-Sheet 1
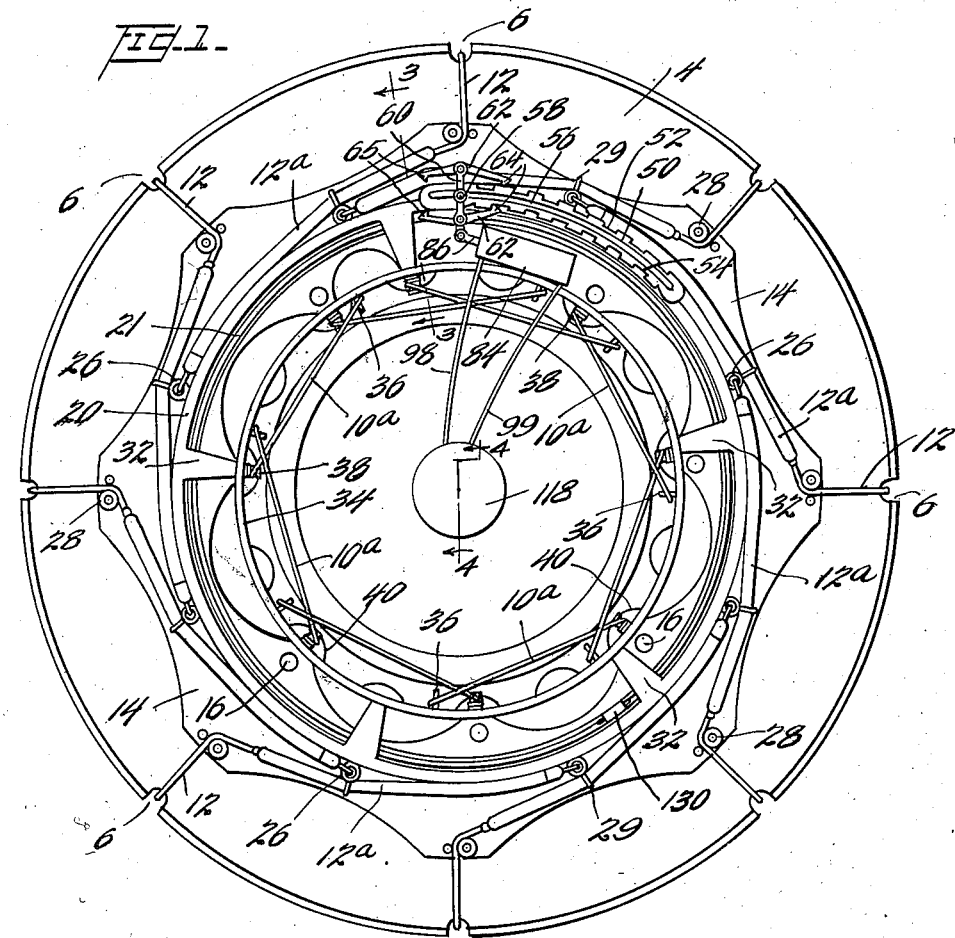
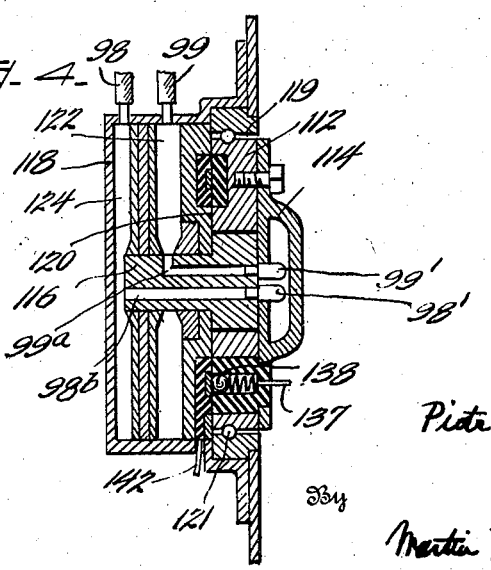
Inventor
Piotr F. Lapidovsky
By
Martin T. Fisher, Attorney.

Jan. 19, 1943.　　　P. F. LAPIDOVSKY　　　2,308,619
APPLYING AND REMOVING ANTISKID CHAINS
Filed Sept. 25, 1941　　3 Sheets-Sheet 2
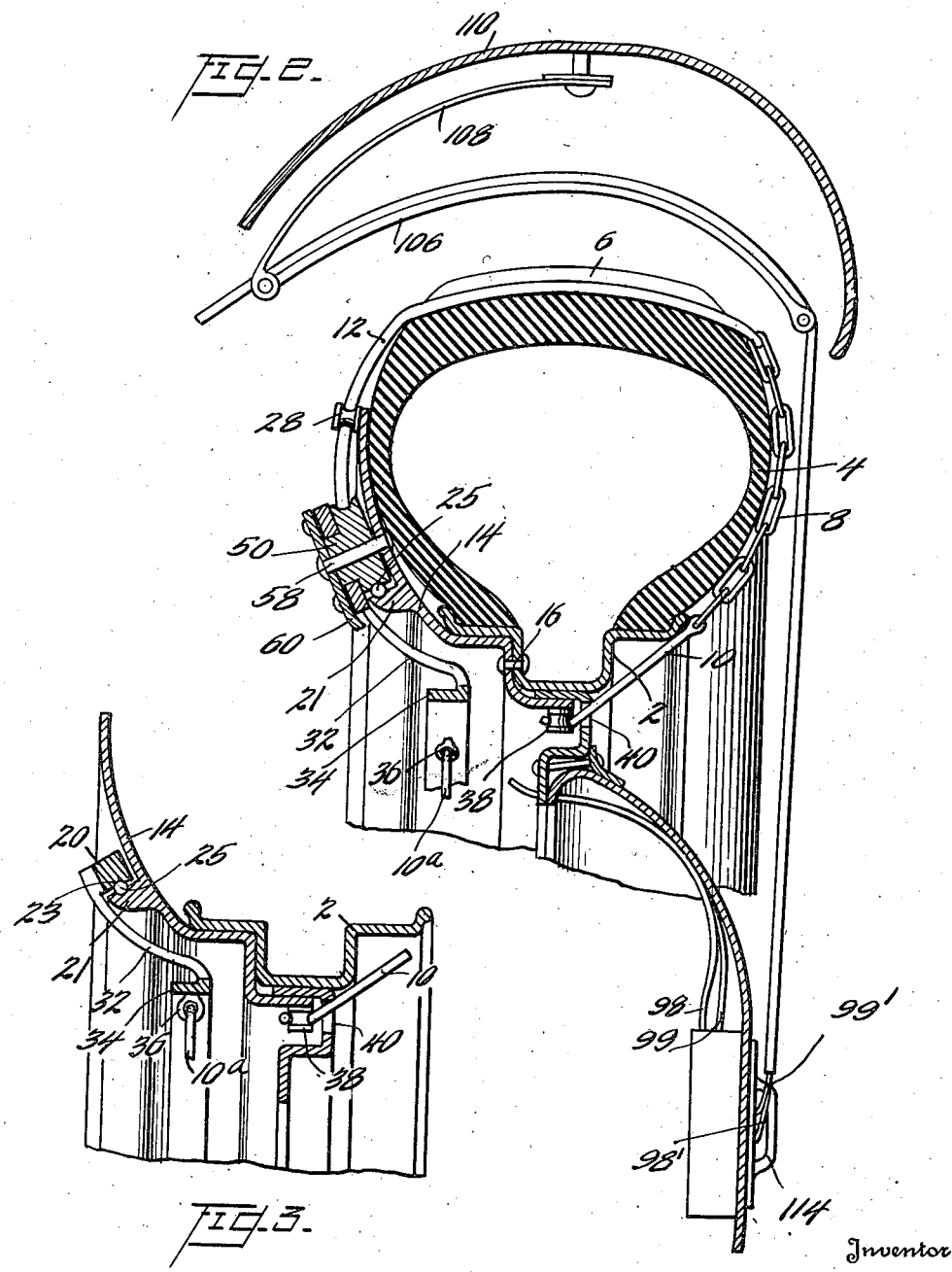
Inventor
Piotr F. Lapidovsky
By Martin T. Fisher, Attorney.

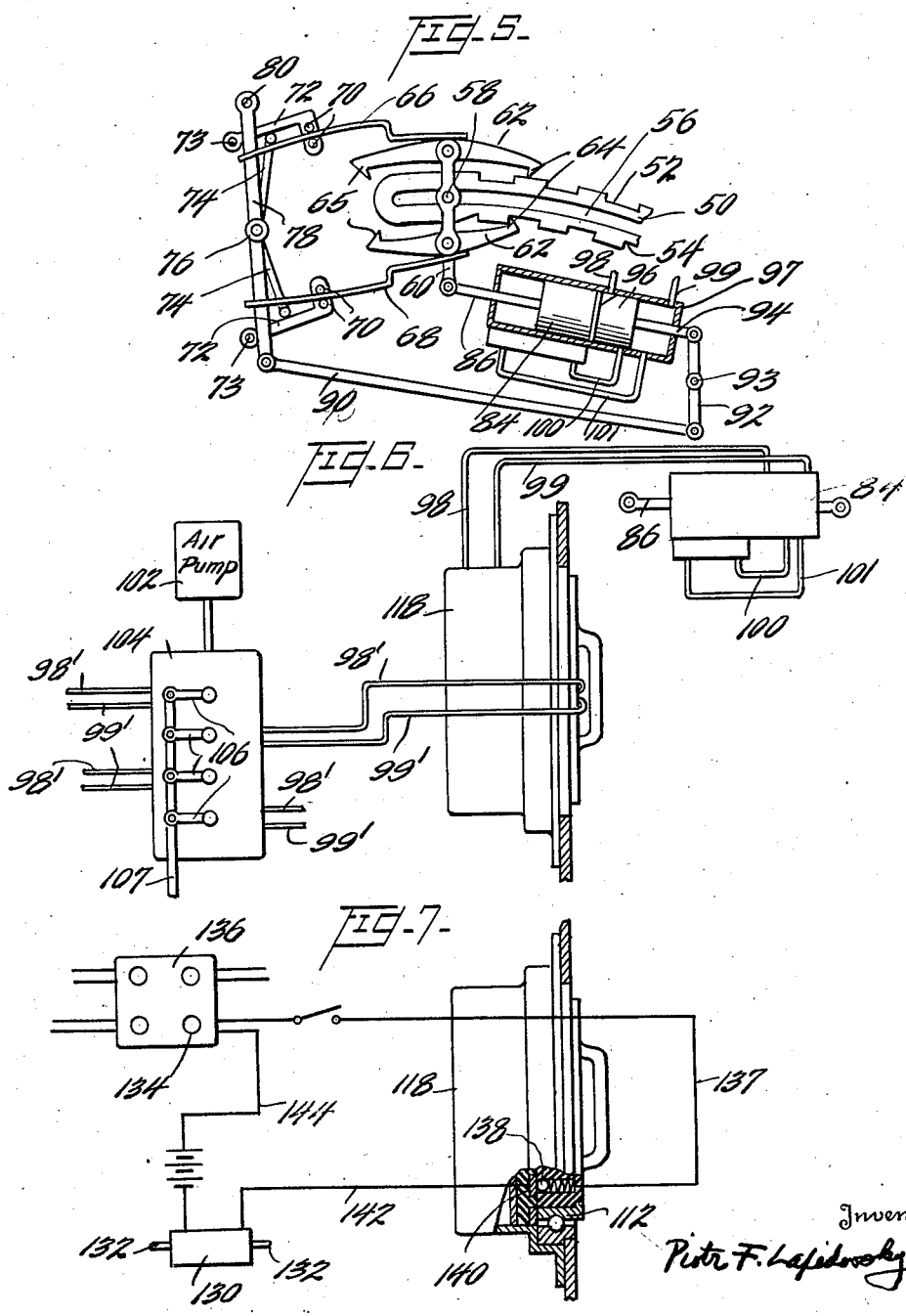

Patented Jan. 19, 1943

2,308,619

UNITED STATES PATENT OFFICE 2,308,619

APPLYING AND REMOVING ANTISKID CHAINS

Piotr F. Lapidovsky, Wilmington, Del.

Application September 25, 1941, Serial No. 412,323

19 Claims. (Cl. 152—216)

This invention is a mechanism for applying anti-skid chains to the tires of a motor vehicle.

According to this invention, the chains are normally carried by the wheel of the vehicle in inoperative position. By the operation of power-operated means controlled by the driver, the chains may be moved to the operative position either individually or collectively, without the necessity of the driver leaving his seat.

The tires of the vehicle are provided with relatively deep, transversely extending grooves, or a jacket or envelope may be applied to the tire, and this jacket may be provided with the transversely extending grooves. The mechanism of this invention draws the chains into these grooves, or out of these grooves, as may be desired.

The power for moving the chains to and from operative position is obtained from a motor which is carried by the wheel. This motor may be electrically or pneumatically operated.

One of the important features of the invention is an actuating ring also carried by the wheel, but movable by the motor arcuately or circumferentially with respect to the wheel.

The several skid chains are in relatively short independent units. One end of each short length of chain is attached to the actuating ring and the other end of each length of chain is also connected to the actuating ring. The connections are so arranged that when the actuating ring is moved by the motor, it pulls on one set of connections to pull the chains into their transverse grooves so that it is therefore in operative position. At the same time, the connections to the other ends of the chain are slacked up. When it is desired to move the chains to the inoperative position, the actuating ring is moved in the opposite direction and the connections on the far side draw each length of chain out of its groove, to the inoperative position and the first set of connections are slacked up.

The described connections to the chains are elastic, so that the pull on the chains in either direction is an elastic one.

Suitable control mechanism accessible to the driver is provided so that he may individually or simultaneously apply and remove the anti-skid chains without leaving his seat. Also located in a position visible to the driver are suitable signals so that he may know whether the chains are in operative or inoperative position.

The operation of applying and removing the chains is entirely automatic as far as the driver is concerned, that is to say, when he operates the control mechanism, the anti-skid chains are applied in operative position, and when he moves the control mechanism to another position, the skid chains are moved to the inoperative position. There is no necessity for the driver to jack up the car or to get out in the mud or snow, which is oftentimes necessary in applying or removing skid chains.

The mechanism is normally carried by the wheel and may be detached therefrom, in case it is only desired to use the skid chains during the winter months. However, the mechanism may remain permanently attached to the wheel for possible use at other seasons for preventing skidding on wet slippery streets and for obtaining suitable traction in mud.

In case one or more of the transverse grooves is clogged with snow, ice or mud, or in case a particular groove is next to the ground so that the chain for that groove cannot be moved into its groove, the described elastic connections will elongate and will draw the chain into its groove as soon as the wheel has made a partial revolution or until this groove will be free from the ground.

Other advantages of construction and operation will be apparent from the following description, taken in connection with the accompanying drawings, illustrating the present preferred embodiment of the invention.

Fig. 1 is a side view of an automobile wheel, showing the mechanism of the present invention;

Fig. 2 is a sectional view, on an enlarged scale, transversely through the tire and upper part of the wheel;

Fig. 3 is a fragmentary sectional view, on line 3—3 of Fig. 1;

Fig. 4 is a sectional view, on an enlarged scale, on the line 4—4 of Fig. 1;

Fig. 5 is an enlarged side view of portions of Fig. 1;

Fig. 6 is a diagrammatic view showing certain pipe connections; and

Fig. 7 is a wiring diagram.

Referring now to these drawings, in which similar reference characters indicate similar parts, 2 indicates a standard type of rim for the wheel of an automotive vehicle. This rim carries the usual tire 4 which is provided with approximately ⅜" deep and ¼" wide transversely extending grooves 6. Supported along one side wall of the tire is a plurality of anti-skid chains 8. These several sections of chain 8 are relatively short. One end of each of the several chains is attached to a strong cable 10, about ⅛" in diameter. This cable has an elastic extension 10a. The other or upper end of chain 8, Fig. 2, is attached to a strong cable 12. Cable 12 has an elastic extension 12a. As shown in Fig. 2, the chains are in inoperative position and the cables 12 lie well within the grooves 6 in the tire. When it is desired to move the chains to operative position, cables 10 are slacked up and cables 12 are pulled, with the result that the chains 8 move into the respective grooves 6 where they are thick enough to project beyond the grooves and provide a suitable anti-skid zone. The reversal of the just described movement will evidently withdraw the chains from the grooves 6 and position them on the side wall of the tire in inoperative position.

In order to accomplish the above described movement of the chains there is provided on the other side of the wheel from where the chains are carried, a strong heavy annular main supporting plate 14, which is suitably bent to conform to and fit the outside of the rim of the wheel, being secured thereto by bolts or rivets 16.

Carried by the plate 14 is the main actuating ring 20 which is arcuately movable back and forth with respect to the plate 14. This main actuating ring 20 moves on and is supported by an annular shoulder 21 which projects outwardly from plate 14. Raceways 23 and anti-friction balls 25 therein are provided for facilitating the movement of the ring 20. The function of the actuating ring 20 when it is moved circumferentially with respect to the plate 14, is to exert a pull on the cables 12 and 12a to pull the skid chains into operative position, and to slack up on the cables 10 and 10a by mechanism now to be described.

The ends of elastic portions 12a of cables 12 are anchored to rings 26 carried by the ring 20.

The actuating ring 20 is provided with a plurality of brackets 32 which extend radially inwardly and support a supplementary actuating ring 34. This ring 34 is provided with a plurality of anchorages 36 for the ends of elastic extensions 10a of cables 10, which extend around pulleys 38 and through suitable apertures 40 in the wheel proper and then are connected to one of the chains 8.

From the mechanism so far described, it will be apparent that when the main actuating ring 20 and the supplemental actuating ring 34 which moves with it, are moved counterclockwise, Fig. 1, tension will be exerted on all of the cables 12 and 12a while the cables 10 and 10a will be slacked up, with the result that the chains will be pulled into operative position in the grooves of the tire. This pull is elastic, due to the elastic portions 12a of the cables, while the elastic portions 10a will elongate and allow the chains to move to operative position, and yet maintain a tension on them at all times. A reversal of this movement will restore the chains to their normal inoperative position. The cables 10 and 10a now do the pulling, while 12 and 12a slack up, elastic portions 12a maintaining the tension.

The provision of the terminal elastic portions 10a and 12a is also useful in case a particular chain cannot be moved into or out of position, by reason of its groove being next to the ground, or being clogged with snow or mud. A stronger elastic pull would evidently be exerted on such a clogged chain, which would pull the chain into or out of its groove after the wheel had made a few revolutions.

The just described back and forth circumferential or arcuate movement of the actuating ring 20 and supplementary actuating ring 34 is accomplished by the mechanism now to be described. The ring 20 carries an arcuate serrated rack 50, Fig. 5, this rack being provided with outer serrations 52 and inner serrations 54. The rack is also provided with a central arcuate slot 56 which slides over the pivot post 58, which post is secured to the main supporting plate 14, Fig. 2. An actuating arm 60 is pivoted on the pivot post 58 and this arm is provided with two claws 62 having right-hand actuating teeth 64 and left-hand actuating teeth 65. When the teeth 64 are resiliently pressed toward each other and the arm 60 rocked back and forth these teeth will alternately engage the outer and inner serrations 52 and 54 in the rack and move the rack and the ring 20 and supplementary ring 34 counterclockwise, Fig. 1. Conversely, if the teeth 65 are resiliently pressed toward each other and the arm 60 rocked back and forth, the rack, and the rings connected thereto, will be moved clockwise. These described movements are effected by the mechanism shown in Fig. 5, which shows flat springs 66 and 68 respectively welded to the claws 62 at about the middle thereof. These springs at their outer ends pass between rods 70 supported on arms 72 pivoted at 73. The ends of these springs are engaged by the arms 74 of toggle levers, the ends of which are pivoted at 76 to the middle of a control arm 78 pivoted at 80. When the arm 78 is moved to the right, about pivot 80, the teeth 64 will be resiliently pressed into engagement with the serrations in the rack and teeth 65 will be disengaged; if the rod 78 is swung the other way, the teeth 64 will be disengaged and the teeth 65 at the other end will be resiliently pressed into operative engagement with the rack.

If arm 60 is rocked back and forth when teeth 64 are in engagement, the rack 50 and ring 20 are moved counterclockwise, and in the opposite direction when teeth 65 are in engagement.

The rocking of the arm 60 is accomplished by any suitable known type of air motor of the reciprocating type, shown diagrammatically at 84, Fig. 5. This motor has a reciprocating arm 86 connected to the actuating arm 60. Reciprocation of the arm 86 will move the rack 50 clockwise or counterclockwise, depending upon which set of teeth 64 or 65 are in engagement with the rack.

The positioning of the control arm 78 is effected by a rod 90 pivoted to the lever arm 92, pivoted at 93, which in turn is pivoted to an actuating rod 94 connected to an air operated piston 96 in cylinder 97 which may be conveniently built in the same casing with the air motor 84. Air under pressure is supplied to one side or the other of the piston 96 through pipes 98 and 99, the selection of the pipe serving to determine the positioning of the piston and accordingly the positioning of the arm 78 and of the actuating teeth 64 and 65. The same air that actuates the piston 96 to move it to one end or the other of its cylinder, passes through either pipe 100 or 101 to the air motor for actuating it.

The supply of air to the control pipes 98 or 99, as the case may be, is controlled by the driver of the car, by mechanism which will now be described.

Referring now to diagrammatic Fig. 6, an air pump 102 supplies air under pressure to the control box 104, which is provided with conventional two-way valves, not shown, one for each of the four wheels of the car. Each two-way valve is actuated by a handle 106 which serves to supply air either to the pipe 98' or 99', as the case may be, depending on the position of the valve. A common handle 107 for all the two-way valves is preferred, so that all the chains will be applied simultaneously. However, individual handles may be provided for each valve, so that the chains may be applied individually if desired.

The pipes 98' and 99' pass from the box 104 to a supporting member 106, Fig. 2, in turn supported by 108 from the fender 110 of the car. These pipes pass downwardly to a fixed housing, indicated generally at 112, Fig. 4, which housing is carried by bracket 114, which in turn is carried at the end of the front or rear axle of the car. Carried by the housing 112 is a fixed laterally extending bearing member 116 provided with channels 99a and 98b respectively connected to the pipes 99' and 98'. Journaled on 112 and 116 is a swiveled housing, indicated generally at 118 and rotatable with respect to the fixed housing 112 along the surfaces indicated at 119 and 120, ball bearings 121 being provided. The housing 118 is provided with partition members defining air spaces 122 and 124, respectively, communicating with the air passages 99a and 98b, these air spaces in turn being connected to the pipes 99 and 98 already described.

From the mechanism just described, it will be seen that by actuating of the valve handle 107, air will pass through 98' or 99' to the fixed housing 112, thence into the air spaces 122 and 124, as the case may be, and thence into either pipe 98 or 99 for actuating the control piston 96 for positioning the claws 64 or 65 in either of their two operative positions. This same air passes through one or the other of pipes 100, 101 to actuate the motor 84, to actuate one set of claws 64 or 65, to move the actuating ring 20 in one direction or the other.

While the positioning of the valve handles 106 would give an indication of whether the chains are applied or not, there is also preferably provided an electrical indicator for this purpose. To this end, the main supporting plate 14 is provided with a switch 130, Figs. 1 and 7, which has actuating pins 132 at opposite ends thereof in position to be engaged by one of the brackets 32. Actuation of one pin closes the switch, while actuation of the other opens it. When the actuating ring 20 is moved, say, counterclockwise, to apply the chains, the switch 130 will be actuated by a bracket 32 to close the circuit, diagrammatically shown in Fig. 7, for lighting a light 134 for indicating to the driver that the chains are applied. When the actuating ring is moved in the opposite direction to remove the chains, the other pin 132 of switch 130 is moved to break the circuit, to indicate to the driver that the chains have been removed. There may be conveniently provided on the dashboard an indicating panel 136 provided with lights 134, one for each wheel. A wire 137 follows the path of the air pipes 98' and 99' to the fixed housing 112 to engage with a brush or spring pressed ball 138 which presses against a conducting ring 140 carried by the swivel part of the housing which, in turn, is connected by wire 142 to the switch 130. The circuit is completed by a wire 144.

To summarize the operation:

When it is desired to apply the chains, handle 106 is moved to supply air through pipes 98', through the swivel housing to the pipes 98; which moves the pistons 96 to the right and puts the claws 64 in a position to engage the rack. This same air then actuates the air motor 84, which rocks the arm 60 to move the actuating ring 20 counterclockwise for pulling on the cables 12a and 12 to pull the chains into the grooves. At the same time ring 20 pulls the chains into position, the ring 34 slacks up on the cables 10a. By the time the chains are in their grooves, one of the brackets 32 actuates switch 130 to light a light 134 in the dash. The same operation is, of course, repeated for each wheel. In order to remove the chains, valve 106 is moved to the other position which supplies air pressure to the pipe 99' and thence through the swivel housing to the pipe 99, which reverses the position of the piston 96 and this causes the rod 90 to reverse the position of the claws 65 and the motor operates to move the rack in the opposite or clockwise direction to cause the chains to be removed. When the ring 20 is moved counterclockwise cables 12 and 12a are pulled and cables 10 and 10a are slacked up. When the operation is reversed, cables 10 are pulled and cables 12 are slacked up.

The mechanism of this invention can also be completely installed on the inner sides of the wheels of the car, instead of on the outside, as described.

While the present preferred embodiment of the invention has been described in some detail, it should be understood that the invention may be carried out in other ways, as expressed within the scope of the following claims.

I claim as my invention:

1. Means for applying anti-skid chains or the like to the tires of a motor vehicle, comprising in combination with a vehicle wheel, an actuating ring operatively connected to said anti-skid chains and mounted on said wheel and circumferentially movable with respect to the wheel, motor means for causing said movement of the actuating ring and anti-skid elements, operatively connected to said actuating ring, and movable into and out of operative position by said arcuate movements of the actuating ring.

2. Means for applying anti-skid chains or the like to the tires of a motor vehicle, comprising a vehicle wheel having a tire provided with transversely extending grooves in the tread thereof, a rim forming part of the vehicle wheel, an actuating ring movable with the vehicle wheel at all times and relatively movable back and forth in an arcuate path with respect to the rim, and anti-skid elements, operatively connected to said actuating ring and movable by it into and out of said transverse grooves.

3. Means for applying anti-skid chains or the like to the tires of a motor vehicle, comprising a vehicle wheel having a tire provided with transversely extending grooves in the tread thereof, a rim forming part of the vehicle wheel, an actuating ring movable with the vehicle wheel at all times and relatively movable back and forth in an arcuate path with respect to the rim, motor operated means carried by the vehicle wheel for effecting said arcuate movement of the actuating ring, and anti-skid elements, operatively connected to said actuating ring and movable by it into and out of said transverse grooves.

4. Means for applying anti-skid chains or the like to the tires of a motor vehicle, comprising a vehicle wheel having a tire provided with transversely extending grooves in the tread thereof, a rim forming part of the vehicle wheel, an actuating ring carried by the vehicle wheel and relatively movable arcuately with respect to the rim, and anti-skid elements, the respective ends of which are operatively connected to the actuating ring, whereby said arcuate movements of the actuating ring serve to move said anti-skid elements into and out of said transverse grooves.

5. Means for applying anti-skid chains or the like to the tires of a motor vehicle, comprising a vehicle wheel having a tire provided with transversely extending grooves in the tread thereof, a rim forming part of the vehicle wheel, an actuating ring carried by the vehicle wheel and relatively movable arcuately with respect to the rim, motor operated means carried by the vehicle wheel for effecting said arcuate movement of the actuating ring, and anti-skid elements, the respective ends of which are operatively connected to the actuating ring, whereby said arcuate movements of the actuating ring serve to move said anti-skid elements into and out of said transverse grooves, respectively.

6. Means for applying anti-skid chains or the like to the tires of a motor vehicle, comprising a vehicle wheel, an actuating ring operatively connected to said anti-skid chains and mounted on said wheel and movable back and forth in an arcuate path with respect to the wheel, motor means carried by the wheel for causing said movement of the actuating ring and means, operable from the driver's seat of the motor vehicle, for controlling the operation of said motor means.

7. Means for applying anti-skid chains or the like to the tires of a motor vehicle, comprising a vehicle wheel, an actuating ring operatively connected to said anti-skid chains and mounted on said wheel and circumferentially movable with respect to the wheel, motor means carried by the vehicle wheel for causing said movement of the actuating ring, anti-skid elements, operatively connected to said actuating ring, and movable into and out of operative position by said arcuate movements of the actuating ring and means, operable from the driver's seat of the motor vehicle, for controlling the operation of said motor means.

8. Means for applying anti-skid chains or the like to the tires of a motor vehicle, comprising a vehicle wheel having a tire provided with transversely extending grooves in the tread thereof, a rim forming part of the vehicle wheel, an actuating ring carried by the vehicle wheel at all times and movable back and forth in an arcuate path with respect to the rim, anti-skid chains operatively connected to said actuating ring, motor operated means carried by the vehicle wheel for effecting said arcuate movement of the actuating ring, and means operable from the driver's seat of the motor vehicle, for controlling the operation of said motor means.

9. Means for applying anti-skid chains or the like to the tires of a motor vehicle, comprising a vehicle wheel, an actuating ring operatively connected to said anti-skid chains and mounted on said wheel and circumferentially movable with respect to the wheel, motor means for causing said movement of the actuating ring, anti-skid elements operatively connected to said actuating ring, and movable into and out of operative position by said arcuate movements of the actuating ring, and signal means for indicating to the driver of the vehicle the operative or inoperative position of the anti-skid elements.

10. Means for applying anti-skid chains or the like to the tires of a motor vehicle, comprising a vehicle wheel, an actuating ring operatively connected to said anti-skid chains and mounted on said wheel and circumferentially movable with respect to the wheel, motor means for causing said movement of the actuating ring, anti-skid elements operatively connected to said actuating ring, and movable into and out of operative position by said arcuate movements of the actuating ring, means operable from the driver's seat, for controlling the operation of said motor means, and signal means for indicating to the driver of the vehicle, the positioning of said anti-skid elements.

11. Means for applying anti-skid chains or the like to the tires of a motor vehicle, comprising a vehicle wheel having a tire provided with transversely extending grooves in the tread thereof, a rim forming part of the vehicle wheel, an actuating ring carried by the vehicle wheel and relatively movable arcuately with respect to the rim, motor operated means carried by the vehicle wheel for effecting said arcuate movement of the actuating ring, anti-skid elements operatively connected to said actuating ring and movable by it into and out of said transverse grooves, and signal means for indicating to the driver the operative or inoperative position of said anti-skid elements.

12. Means for applying anti-skid chains to the tires of a vehicle, comprising in combination with the vehicle wheel, an actuating ring, a tire provided with transversely extending grooves, a plurality of anti-skid chains carried by the vehicle wheel and having respective ends thereof connected to said actuating ring, certain of such connections being movable in respective transverse grooves, and means for moving said actuating ring circumferentially for effecting the movement of the chains to and from operative positions in the transverse grooves.

13. The combination as claimed in claim 12, in which the connecting members at each end of each chain are elastic.

14. Apparatus for applying anti-skid chains or the like to the tires of a motor vehicle, comprising in combination with a vehicle wheel, an actuating ring mounted on the vehicle wheel and rotatable with the wheel at all times, anti-skid chains mounted on the vehicle wheel and rotatable therewith at all times, and operatively connected to said actuating ring, and means for moving said actuating ring back and forth, in an arcuate path, such movements of the actuating ring serving to move the anti-skid chains into and out of operative position with respect to the tire.

15. Apparatus for applying anti-skid chains or the like to the tires of a motor vehicle, comprising in combination with a vehicle wheel, an actuating ring mounted on the vehicle wheel and rotatable with the wheel at all times, anti-skid chains mounted on the vehicle wheel and rotatable therewith at all times, and operatively connected to said actuating ring, and motor means, carried by the vehicle wheel, for moving said actuating ring back and forth, in an arcuate path, such movements of the actuating ring serving to move the anti-skid chains into and out of operative position with respect to the tire.

16. Apparatus for applying anti-skid chains or the like to the tires of a motor vehicle, comprising in combination with a vehicle wheel, an actuating ring mounted on the vehicle wheel and rotatable with the wheel at all times, antiskid chains mounted in inoperative position at one side of the vehicle wheel and operatively connected to said actuating ring, and means for arcuately moving said actuating ring back and forth for moving said chains into and out of operative position with respect to the tire.

17. Apparatus for applying anti-skid chains or the like to the tires of a motor vehicle, comprising in combination with a vehicle wheel, an actuating ring mounted on the vehicle wheel and rotatable with the wheel at all times, anti-skid chains mounted in inoperative position at one side of the vehicle wheel and operatively connected to said actuating ring, and motor means carried by the vehicle wheel, for arcuately moving said actuating ring back and forth for moving said chains into and out of operative position with respect to the tire.

18. Apparatus for applying anti-skid chains or the like to the tires of a motor vehicle, comprising in combination with a vehicle wheel, an actuating ring mounted on the vehicle wheel and rotatable with the wheel at all times, anti-skid chains in individual short lengths mounted on the vehicle wheel and rotatable therewith at all time, each end of each short length of chain being operatively connected to said actuating ring, and means for arcuately moving said actuating ring back and forth for moving said lengths of chain into and out of operative position with respect to the tire.

19. Apparatus for applying anti-skid chains or the like to the tires of a motor vehicle, comprising in combination with a vehicle wheel, an actuating ring mounted on the vehicle wheel and rotatable with the wheel at all times, anti-skid chains in individual short lengths mounted on the vehicle wheel and rotatable therewith at all times, each end of each short length of chain being operatively connected to said actuating ring, and motor means carried by the vehicle wheel, for arcuately moving said actuating ring back and forth for moving said lengths of chain into and out of operative position with respect to the tire.

PIOTR F. LAPIDOVSKY.